No. 779,575. PATENTED JAN. 10, 1905.
B. A. BEHREND.
POLYPHASE WINDING.
APPLICATION FILED NOV. 6, 1903.

Witnesses
L. R. Sager
George H. Kerr

Inventor
Bernard A. Behrend
By
O. Edwards
Attorney

No. 779,575.                                             Patented January 10, 1905.

UNITED STATES PATENT OFFICE.

BERNARD A. BEHREND, OF NORWOOD, OHIO, ASSIGNOR TO BULLOCK ELECTRIC MANUFACTURING CO., A CORPORATION OF NEW JERSEY.

POLYPHASE WINDING.

SPECIFICATION forming part of Letters Patent No. 779,575, dated January 10, 1905.

Application filed November 6, 1903. Serial No. 180,038.

*To all whom it may concern:*

Be it known that I, BERNARD A. BEHREND, a citizen of the United States, residing at Norwood, in the county of Hamilton and State of Ohio, have invented certain new and useful Improvements in Polyphase Windings, of which the following is a full, clear, and exact specification.

My invention relates to windings of dynamo-electric machines, and particularly refers to polyphase windings.

One objection to polyphase windings when several coils per pole are used is that the amount of copper required in the end turns of the outer coils greatly increases in comparison with that of the inner coil, due to the greater distance between the conductors of the outer coils and to the fact that they must encompass the inner coils. This not only causes increased cost and the coils to be cumbersome, but also causes them to project a considerable distance from the frame, where they are exposed to injury and are also unsightly. Furthermore, the resistance losses are necessarily considerable in these long end turns. Another objection is that it is necessary to provide a separate former for each of the coils per pole.

By my invention the above objections are overcome, resulting in a reduction of the number of formers necessary, less weight of copper, higher efficiency, and better appearance. In attaining these ends I distribute the coils in such a way that the magnetic flux instead of passing through a single set of concentric coils passes from a field-magnet through a portion of the coils and then returns through the remaining portion to the field-magnet of opposite polarity.

My invention is shown as applied to a two-phase winding having six slots per pole, and in displacing the coils as above mentioned I arrange two of the coils concentric with each other and one coil displaced angularly.

For a full understanding of my invention reference may be had to the following description and annexed drawings, and the novelty thereof will be more definitely stated in the appended claims.

Figure 1:
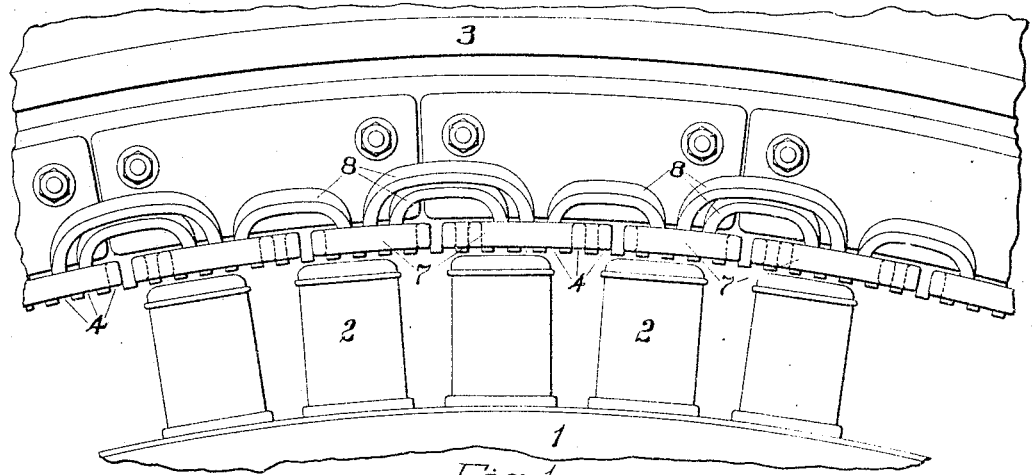
Figure 2:
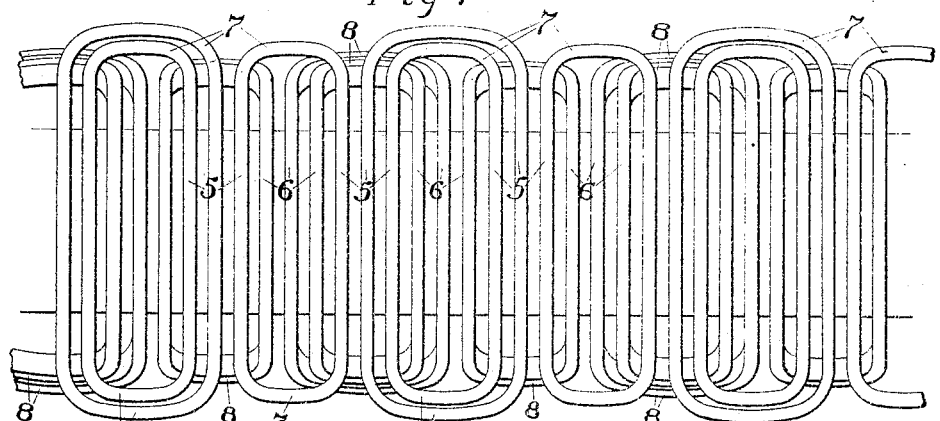

Figure 1 is a side view of a portion of a machine to which my invention is applied. Fig. 2 is an interior view of the windings shown in Fig. 1, and Fig. 3 is a diagram of the connections for an eight-pole machine.

A portion of the field-frame is shown at 1 and carries the poles 2, alternate poles being of opposite polarity. The armature-windings are carried by the frame 3, which in this case is shown as the stationary frame, and are located in slots 4. There are six slots per pole provided, and every alternate set of three slots are occupied by the windings 5 of one phase, and the intervening alternate sets of three slots are occupied by the windings 6 of the other phase. The end connections of the windings 7 of one phase lie in the same cylindrical surface as the main portion of the conductor and the end connections of the windings 8 of the other phase are turned outwardly. Considering the windings 5 of one phase it will be noted that six conductors instead of being connected at the ends to form three concentric coils, as has been done prior to my invention, have only four conductors connected, so as to form two concentric coils, and that the two remaining conductors are connected to other conductors so to form single coils displaced angularly from the two concentric coils. The conductors of the winding 6 are similarly connected. The winding of each phase is therefore made up of single coils arranged between and angularly displaced from sets of two concentric coils. Considering one phase only, there are therefore two concentric coils, then a single coil, then two concentric coils, and so on successively. The conductors of each phase are located within the inner of the two concentric coils and the single coil of the other phase.

Figure 3:
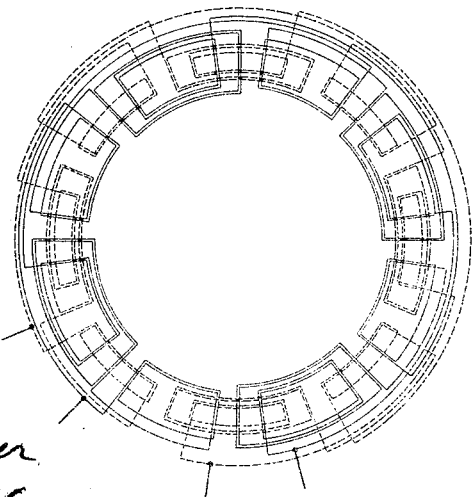

Fig. 3 shows a diagram of the winding for an eight-pole machine, the winding of one phase being shown in full lines and that of the other phase in dotted lines. The winding, as shown, is a two-circuit winding, having the two halves for each phase connected in parallel. It will be evident from following the circuits that the current in the two concentric coils is opposite in direction to that in the single coils, since poles of one polarity are opposite the concentric coils when poles of the other polarity are opposite the single coils.

The single coil and the inner of the two concentric coils are of the same size and may be made on the same former. Thus only two formers for each phase is necessary. It is evident that my arrangement of coils greatly reduces the amount of copper required in the end connections over what would be necessary if three concentric coils were used. The resistance of the winding is therefore reduced and the efficiency increased.

While I have shown my invention applied to a two-phase winding and also specific forms of coils, yet it is to be understood that I am not limited to the exact construction shown, as my invention may be applied to other windings of more than two phases and the specific form of the coils may be varied and still be within the scope of the claims.

I claim as my invention—

1. In a winding for dynamo-electric machines, the combination of the field-poles and a polyphase winding in which the number of coils in each phase winding opposite adjacent field-poles is different, substantially as described.

2. In a winding for dynamo-electric machines, the combination of the field-poles and a polyphase winding in which the winding of each phase consists of a series of concentric coils and a series of single coils, the two single coils alternating with the two concentric coils.

3. In a winding for dynamo-electric machines, the combination of the field-poles and a polyphase winding in which the winding of one phase consists of a series of concentric coils alternating with a series of coils of a less number than in said series of concentric coils.

4. In a winding for dynamo-electric machines, the combination of the field-poles and a polyphase winding in which the winding of each phase consists of a series of concentric coils alternating with a series of coils of a less number than in said series of concentric coils.

5. In a dynamo-electric machine, the combination of the field-poles and a two-phase armature-winding, the winding in each phase consisting of a series of two concentric coils and a series of single coils alternating with each other substantially as described.

6. An armature-winding for alternating-current machines, consisting of a series of concentric coils alternating with a series of coils of a less number than in said series of concentric coils.

7. A polyphase armature-winding for alternating-current machines in which the winding of each phase consists of a series of concentric coils alternating with a series of coils of a less number than in said series of concentric coils.

In testimony whereof I affix my signature in presence of two witnesses.

BERNARD A. BEHREND.

Witnesses:
L. K. SAGER,
LEO GROTHAUS.